(No Model.) 4 Sheets—Sheet 1.
P. KENNEDY.
MEANS FOR CONTROLLING ELECTRIC CURRENTS.
No. 594,744. Patented Nov. 30, 1897.
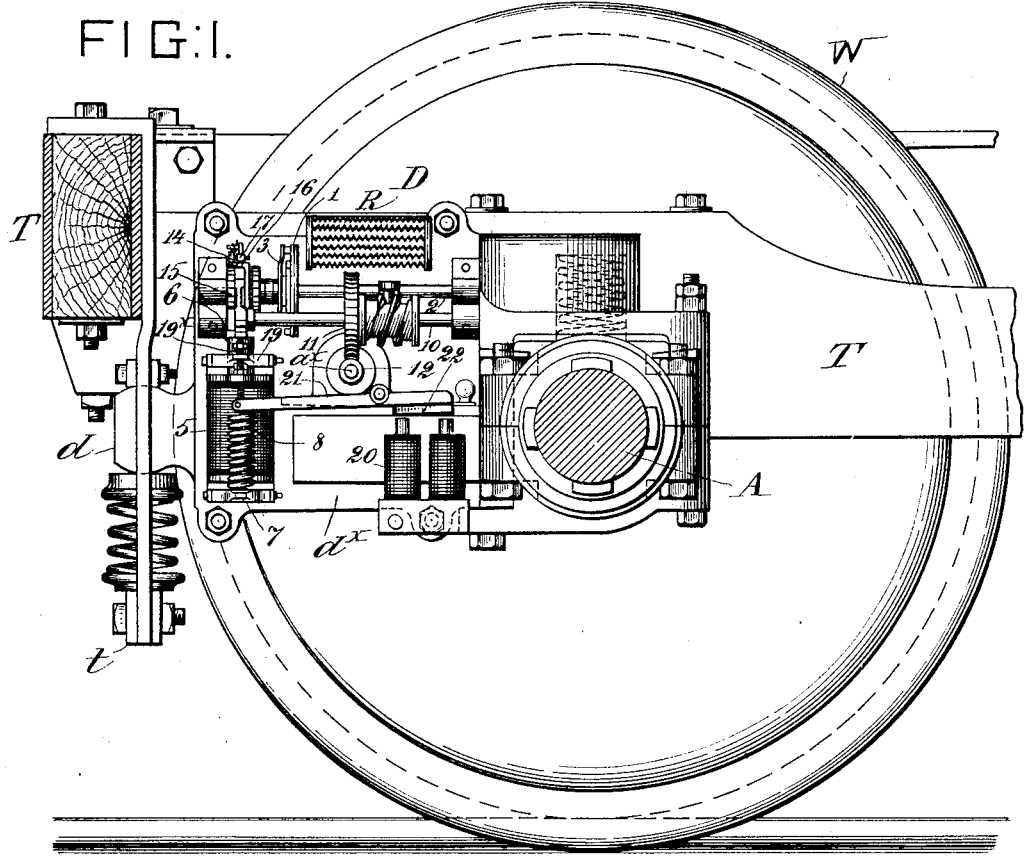
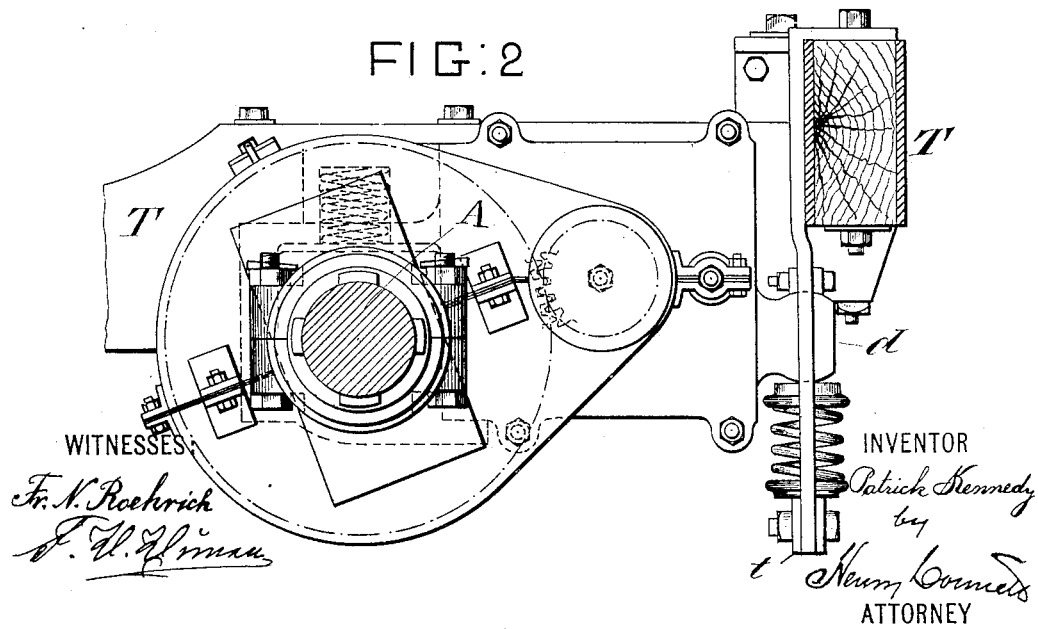
WITNESSES
Fr. N. Roehrich
INVENTOR
Patrick Kennedy
by
Henry Connett
ATTORNEY (No Model.) 4 Sheets—Sheet 2.
P. KENNEDY.
MEANS FOR CONTROLLING ELECTRIC CURRENTS.
No. 594,744. Patented Nov. 30, 1897.
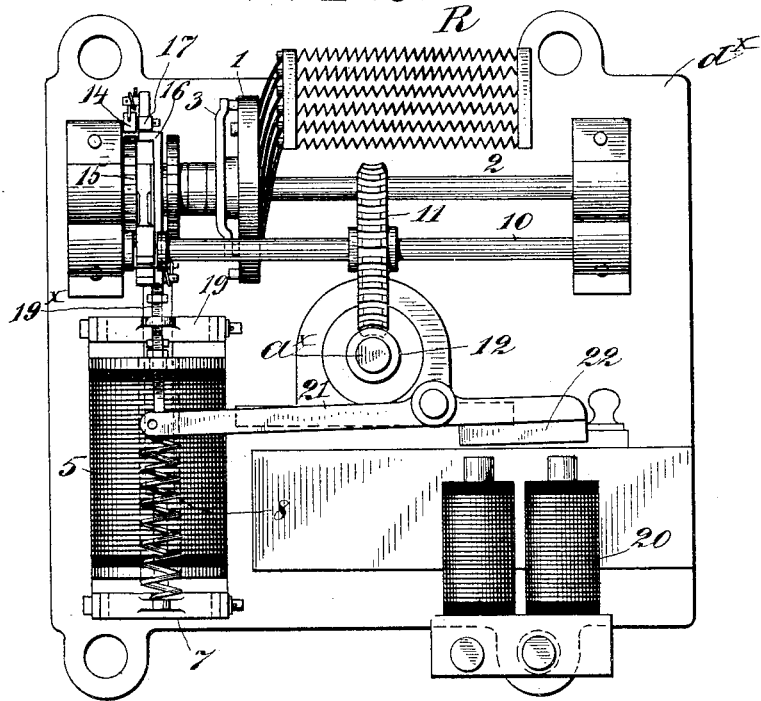
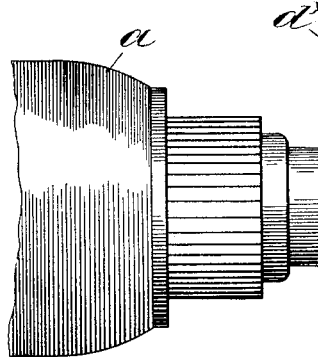
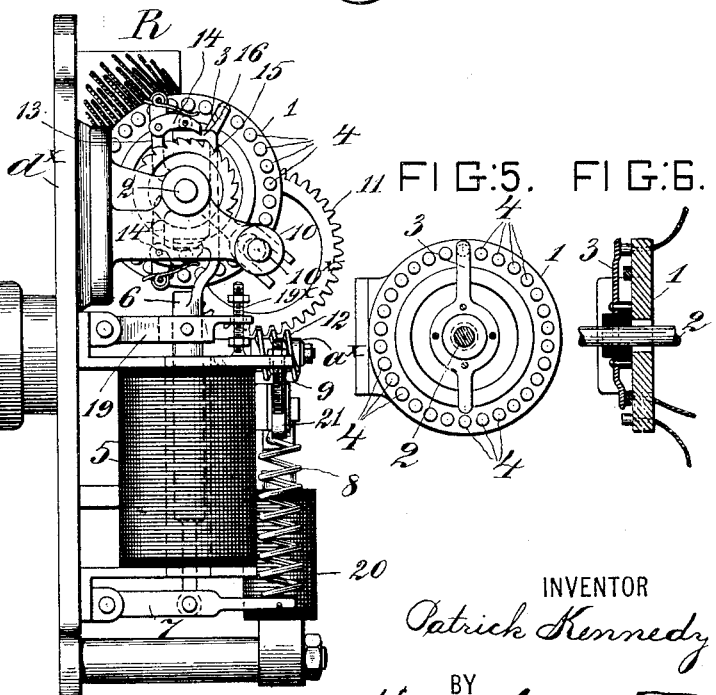
WITNESSES:
INVENTOR
Patrick Kennedy
BY
Henry Connett
ATTORNEY (No Model.) 4 Sheets—Sheet 3.
P. KENNEDY.
MEANS FOR CONTROLLING ELECTRIC CURRENTS.
No. 594,744. Patented Nov. 30, 1897.
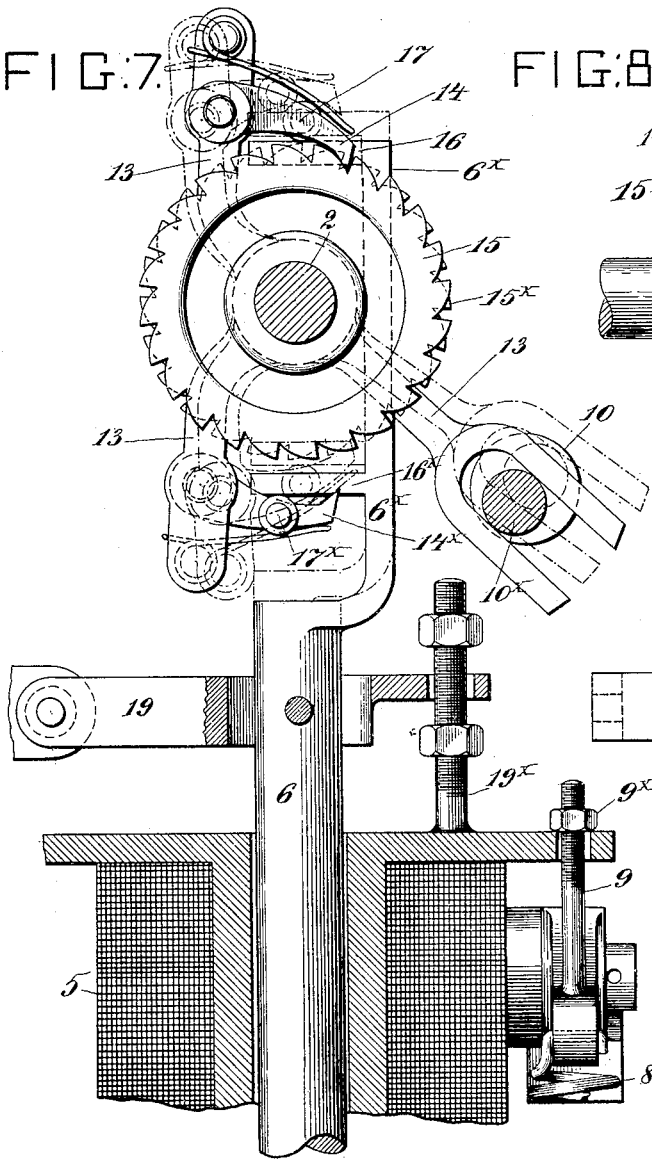
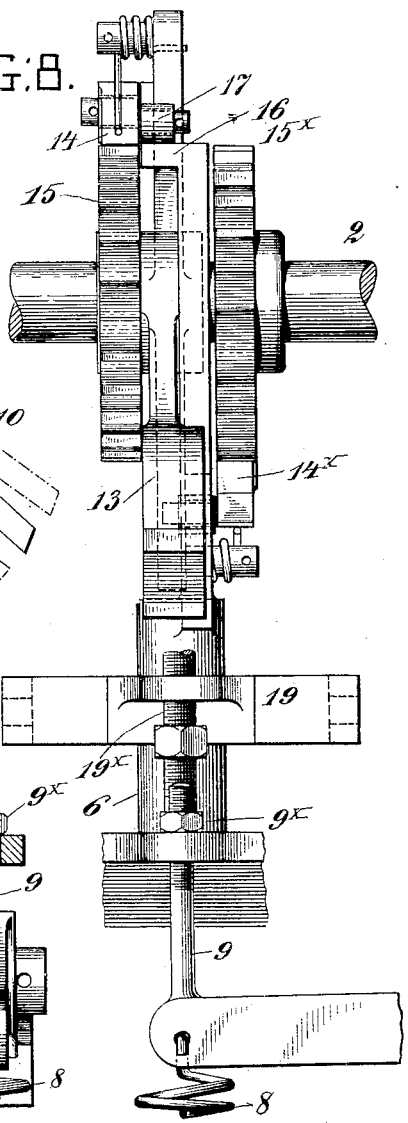
WITNESSES:
Fr. N. Roehrich
J. H. Himae
INVENTOR
Patrick Kennedy
BY
Henry Connett
ATTORNEY

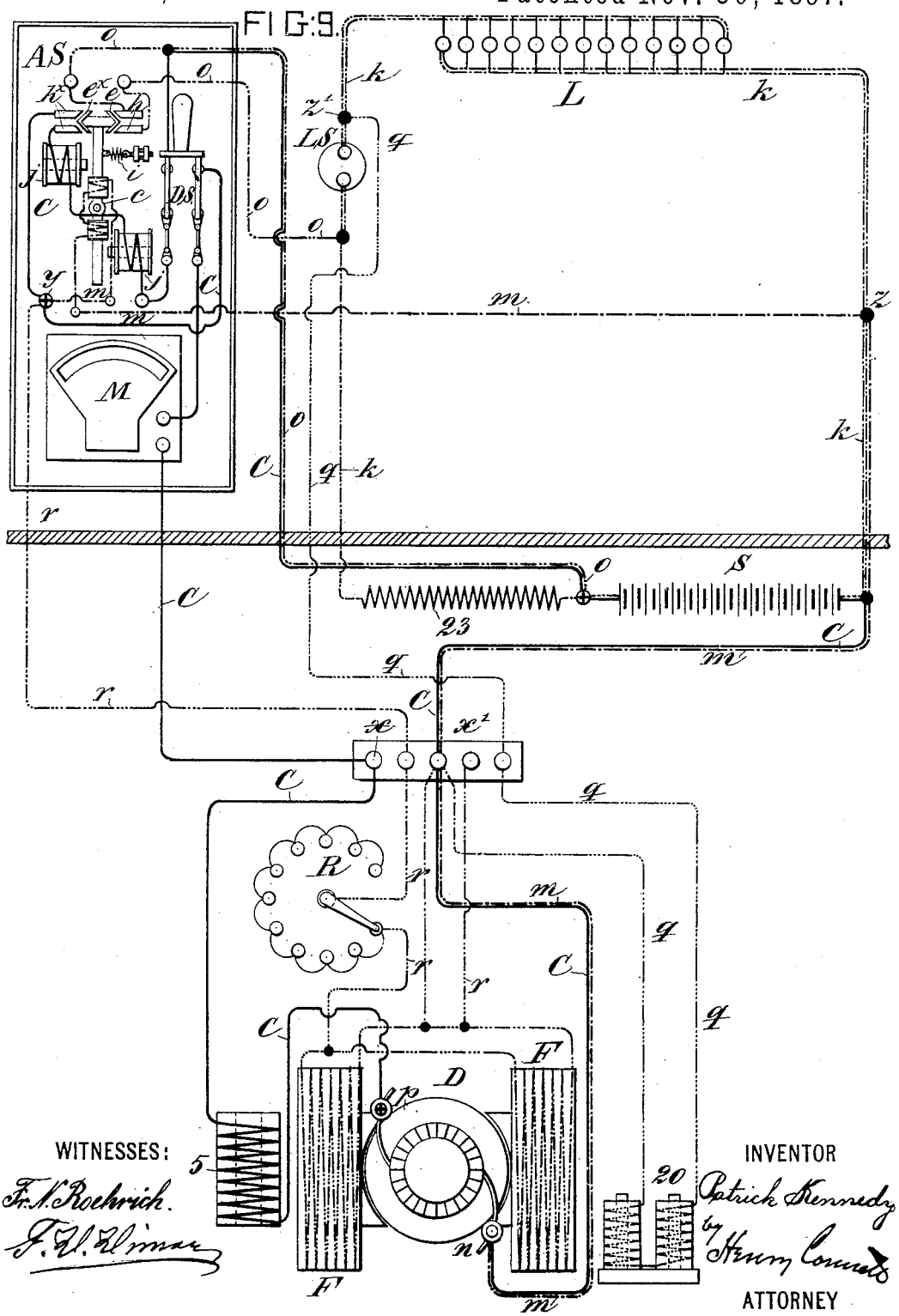

UNITED STATES PATENT OFFICE.

PATRICK KENNEDY, OF BROOKLYN, NEW YORK, ASSIGNOR TO THE AMERICAN RAILWAY ELECTRIC LIGHT COMPANY, OF NEW YORK, N. Y.

MEANS FOR CONTROLLING ELECTRIC CURRENTS.

SPECIFICATION forming part of Letters Patent No. 594,744, dated November 30, 1897.

Application filed April 26, 1897. Serial No. 633,871. (No model.)

*To all whom it may concern:*

Be it known that I, PATRICK KENNEDY, a citizen of the United States, residing at Brooklyn, in the county of Kings and State of New York, have invented certain new and useful Improvements in Means for Controlling Electric Currents, of which the following is a specification.

This invention relates to means or devices for controlling electric currents generated by a dynamo, and particularly to such means when employed in connection with a dynamo and an external circuit fed by said dynamo and containing an accumulator and a series of lamps, wherein the dynamo is subject to variations in speed—as in car-lighting systems, for example.

The purpose and object of the invention is in the main to provide automatic means for regulating the current flowing in an exterior circuit fed by a dynamo in order to maintain such current substantially uniform and to adapt such regulating means automatically to altered conditions when a series of lamps, for example, in the exterior circuit is cut out.

The invention will be fully described hereinafter with reference to the accompanying drawings and its novel features carefully defined in the claims.

In the said drawings, which illustrate an embodiment of the invention as adapted to a car-lighting system, Figure 1 is a side view of the dynamo and appurtenances, the side plate of the inclosing casing being omitted; and Fig. 2 is a view of the opposite side of the same. Fig. 3 is a side elevation of the apparatus as seen from the same point of view as Fig. 1, but on a larger scale. Parts not relating to the present invention have been omitted from this view in order to make the construction to which this application relates more clear. Fig. 4 is a view of the apparatus as seen from the left in Fig. 3. Fig. 5 is a face view of the resistance disk or dial detached, and Fig. 6 is a vertical diametrical section of the same. Figs. 7 and 8 are views on a large scale, illustrating the ratchet mechanism through which the resistance in the field-magnet coils is increased or diminished. Fig. 9 is a diagrammatic view showing the circuits.

Referring to the first four figures of the drawings, A represents the axle of a car; W, a wheel thereon; T, the truck-frame of the car, and D the dynamo as a whole. The dynamo is supported in part on the axle A, and its frame is furnished with a lug $d$, which has a cushioned support in a pendent portion $t$ of the truck-frame. The armature $a$ in Fig. 4 of the dynamo is driven from a gear-wheel on the car-axle. In practice the dynamo and all of its appurtenances will be inclosed in a dust-proof casing or casings in order to protect the working parts from dust and grit.

The features of the apparatus to which this application most particularly relate are designated mainly by reference-numerals.

R is a resistance box or rheostat in the field-magnet circuit mounted on the frame $d^\times$ of the dynamo. This device has no special novelty of itself. The various resistance-coils in the box are adapted to be thrown into the circuit through the field-magnet coils in series to gradually increase the resistance in said circuit. The terminals of the said coils are arranged in a circle on a disk or dial 1, fixed in position. This disk is shown detached in Figs. 5 and 6. Fixed on a shaft 2, rotatively mounted in bearings on the dynamo casing or frame, is a contact-finger 3, adapted to move about the dial 1 and to throw in or cut out more or less of the rheostat-coils by contact with the terminals 4 of the same, thus varying the resistance in the field-magnet coils of the dynamo. The movement of the contact-finger 3 is effected by means which will now be described. A solenoid 5, the coil of which is in the main exterior circuit fed by the dynamo, has a movable core 6, coupled at its lower end to a lever 7, Fig. 4, to the free outer end of which is coupled the lower end of a distensible coil-spring 8. The upper end of this spring is coupled to a slide-rod 9, Figs. 7 and 8, which is adapted to play in a hole in a fixed part and is provided with a head or nut $9^\times$. The spring 8 tends to press the core 6 upward in the coil as the parts are here disposed, and the current flowing through the coil of the solenoid tends to press the core downward proportionately to the strength of the current.

On a shaft 10, rotatively mounted on the frame of the dynamo, is fixed a worm-wheel 11 in gear with a screw or worm 12, Fig. 3, on the arbor $a^\times$ of the armature $a$. Through this gearing the armature rotates the shaft 10. In the shaft 10 is formed a crank $10^\times$, Fig. 7, which engages a forked bearing in a rocking pawl-carrier 13, adapted to turn or rock about the shaft 2, which carries the finger 3. To the respective arms or branches on the carrier 13 are pivotally attached spring-pawls 14 and $14^\times$, arranged in different planes, one above and one below, and adapted to engage at proper times, respectively, the teeth of reversed ratchet-wheels 15 and $15^\times$, fixed on the shaft 2.

On the upper end of the core 6, of the solenoid, which core is arranged under the ratchet-wheels, and the shaft 2 is a prolongation $6^\times$ of the core, Figs. 7 and 8, which has two lifting branches 16 and $16^\times$, adapted to engage studs 17 and $17^\times$ on the respective pawls 14 and $14^\times$, the branch 16 taking under the stud on the upper pawl 14 and the branch $16^\times$ taking over or above the stud on the lower pawl $14^\times$.

Rotation of the shaft 10 and crank $10^\times$ therein imparts a continuous vibrating rocking movement to the pawl-carrier, and this imparts a to-and-fro motion to the pawls alternately, as will be readily understood by inspection of Fig. 7, and the direction of the intermittent rotary motion imparted to shaft 2 by the action of the pawls on their respective ratchet-wheels will depend on which pawl is in operative position, as only one at a time will be operative. Normally the spring 8 draws up the core of the solenoid and allows the lower pawl $14^\times$ to engage the ratchet-wheel $15^\times$, and thus rotate the shaft 2 to the left, as the parts are seen in Figs. 4 and 7. The effect of this will be to carry the contact-finger 3 about the dial 1 to the left; but when the current flowing through the solenoid-coil has strength sufficient to overcome the spring 8 the core 6 will move down and permit the upper pawl 14 to engage the teeth of the wheel 15, and thus move the finger 3 in the opposite direction. At the same time the downward movement of the core 6 causes the stud $17^\times$ to move the pawl $14^\times$ out of engagement. In one position of the core neither pawl will be in engagement, and consequently there will be no change in the position of the finger 3 until the strength of the current through the solenoid either increases or diminishes. Thus is provided a very efficient and sufficiently delicate regulator for the strength of the current in the main exterior circuit, as this will by controlled by the resistance thrown into or cut out from the field-magnet coils.

At its upper end the core 6 of the solenoid, Figs. 7 and 8, is coupled to a guide-arm 19, pivoted to the frame, the free end of said arm being limited in its movements by nuts on an upright rod $19^\times$.

It will be obvious that the tension of the spring 8 marks the limit which the strength of the current flowing through the solenoid-coils must reach before resistance is thrown into the field-magnet circuit. The greater this tension the stronger must be the current to overcome it. Hence by carefully adjusting the tension of this spring 8 the maximum strength of the current can be regulated very exactly. In some cases, however, it is desirable to automatically reduce the tension of the spring 8 to a considerable degree—as, for example, when the dynamo is feeding a lamp-circuit in a car and the lamps are all turned off for a daylight run. To effect this object the mechanism now to be described is employed.

Mounted on the frame is an electromagnet 20, (seen best in Fig. 3,) and above it is situated an armature-lever 21, one arm of which carries an armature 22, situated within the field of force of the magnet 20, and the other arm of which is coupled to the upper end of the spring 8. When the magnet 20 is excited, it draws the armature 22 down to its poles and puts a tension on the spring 8. Now when the current is flowing through an electric-light circuit it also flows through the coils of the magnet 20, and thus keeps a tension on the spring 8, which must be overcome by the current flowing through the solenoid-coil, and in consequence the current in the main exterior circuit fed by the dynamo will be at its maximum or standard; but when the lights are cut out, as for a daylight run, the circuit through the coils of the magnet 20 is broken, and in consequence the tension of the spring 8 is at once greatly reduced, and the result is that a considerable resistance is at once thrown into the field-magnet coils of the dynamo, as will be understood. This reduces the maximum or standard of strength of the current in the main circuit to the degree required or predetermined.

The circuits, switches, &c., seen in the diagram Fig. 9 will now be described.

D is the dynamo, 5 the solenoid, R the rheostat, and 20 the controlling-magnet, all of which have been referred to before.

M is a meter in the main exterior circuit.

S is a storage battery or accumulator in multiple in the main exterior circuit.

L is a lamp series in multiple in the main circuit.

L S is the switch for cutting out the lamps.

D S is a switch for cutting out the dynamo from both the lamp and accumulator circuits, and A S represents, as a whole, an automatic switch which, when the generator is not operating, cuts the latter out from the lamp-circuit, leaving the latter to be supplied from the accumulator only; but it automatically switches in the generator when the strength of the current fed by it rises to a predetermined point.

To facilitate the following up of the circuits, it may be well to explain here the construction of the switch A S, premising that in itself this switch is not new. An electromagnet $c$ is pivotally mounted in the manner of a lever and carries on one of its arms two circuit-closers $e$ and $e^\times$. A spring $i$ tends to keep the closer $e$ up to two circuit-terminals $h$, normally thus closing the break in a circuit between said terminals; but when the lever-magnet is moved in the other direction against the tension of the spring $i$ the closer $e^\times$ closes a circuit, of which $h^\times$ are terminals. The main exterior circuit C, fed by the dynamo, is represented in Fig. 9 by a heavy black line. The current flows from the positive brush $p$ of the dynamo D to the solenoid 5, thence to a binding-post $x$, thence to the meter M, thence through one branch of the switch D S to a binding-post $y$, shown as at the switch A S, thence to a terminal $h^\times$, and through the closer $e^\times$ to the other terminal $h^\times$, thence through the coils of two electromagnets $jj$, arranged at opposite sides of the respective arms of the lever-magnet $c$, thence through the other branch of the switch D S to one pole of the accumulator S, thence from the other pole of said accumulator to a binding-post $x'$, and thence to the negative brush $n$ of the dynamo. There is a split in the circuit at the poles of the accumulator S, forming the lamp-circuit $k$, which is represented in Fig. 9 by a repetition of a long dash, a dot, and a short dash. The current flows through this circuit from the positive pole of the accumulator through a resistance-coil 23 to the switch L S, thence to the series of lamps L, and thence back to the negative pole of the accumulator. This circuit is always closed to the accumulator except when broken at the switch L S. From the binding-post $y$ there is a branch $m$ of the main circuit, which is designated by a repetition of a dash and dot. Through this circuit $m$ a current flows through the coils of the lever-magnet $c$, thence to a binding-post $z$, and thence to the negative brush of the dynamo. This circuit is always closed to the dynamo when the switch D S is closed. Another branch $o$ from the main circuit is indicated by the repetition of a dash and two dots. The current in this circuit flows from the positive pole of the accumulator to one of the terminals $h$ at the switch A S, thence through the circuit-closer $e$ to the other contact $h$, thence to the switch L S, thence through the lamp-circuit, and thence back to the negative pole of the accumulator. When the circuit $o$ is closed at the terminals $h\ h$ and the main circuit is open at the terminals $h^\times h^\times$, the lamps will be fed from the accumulator only by this circuit $o$; but when the main circuit is closed at the terminals $h^\times h^\times$ and the circuit $o$ is broken at the terminals $h\ h$ the lamps and accumulator will both be in circuit with the generator.

Now let us suppose at starting that the accumulator is charged, the generator not in operation, the circuit $o$ closed at the terminals $h\ h$ by the spring $i$, and the switch L S open. If we close the switch L S, the lights L will be supplied from the accumulator S. If we now set the generator in motion, a current will flow through the circuit $m$ and excite the electromagnet $c$, causing it to move toward the poles of the electromagnets $j$ as soon as the current becomes strong enough to overcome the spring $i$. This movement causes the circuit-closer $e^\times$ to close the main circuit C at the terminals $h^\times h^\times$. The magnets $j\ j$ will now be strongly excited and hold the magnet $c$ firmly in this position. The circuit $o$ is broken and the current flows, as before stated, from the dynamo to the accumulator and lamps. The magnet 20 is in a circuit $q$, indicated by a repetition of a dash and four dots. The current flowing through this circuit leaves the lamp-circuit at a binding-post $z'$, beyond the switch L S, flows thence through the coils of magnet 20, thence to the binding-post $x'$, and thence to the negative brush of the dynamo. When the lamps are turned out, this circuit is broken.

F in Fig. 9 represents the field-magnets. The current flows through a circuit $r$, indicated by a repetition of a dash and three dots, from the binding-post $y$ to and through the rheostat R, thence to and through the coils of the field-magnets F, thence to the binding-post $x'$, and thence to the negative brush of the dynamo.

The resistance-coil 23 serves to reduce the strength of the current flowing from the accumulater S to the lamps, and its value in ohms will be governed by the difference in the voltage desired in the lamp-circuit and the maximum voltage liable to accumulate in the storage battery.

By opening both branches of the switch D S the dynamo is cut out and the main circuit and its branches are opened.

Having thus described my invention, I claim—

1. In a device for controlling electric currents, the combination with a dynamo, an external circuit fed by said dynamo, a rheostat in the field-magnet circuit of the dynamo, and a solenoid in the said external circuit, said solenoid having a movable core and a spring connected therewith, of the said spring and core, the latter provided with pawl-operating branches 16 and $16^\times$, the rotatively-mounted shaft 2, the contact-finger 3, carried by said shaft and adapted to move over the coil-terminals of the rheostat, the ratchet-wheels 15 and $15^\times$, fixed on said shaft 2, the crank-shaft 10, driven from the armature of the dynamo, the rocking pawl-carrier 13, rocked by said crank-shaft, and the spring-pawls 14 and $14^\times$, carried by said pawl-carrier and adapted to engage the respective ratchet-wheels 15 and $15^\times$, the branches 16 and $16^\times$ on the core of the solenoid being adapted to shift said pawls, respectively, into and out of engagement by the movement of the solenoid-core, substantially as set forth.

2. In a device for controlling electric currents, the combination with a dynamo, an external circuit fed by said dynamo, a solenoid in said external circuit, the movable core of said solenoid and its spring, a rheostat in the field-magnet circuit of the dynamo, and mechanism, substantially as described, whereby the movement of the solenoid-core controls the resistance in the said field-magnet coils, of a branch circuit from the main exterior circuit, means for breaking said branch circuit, an electromagnet 20 in said branch circuit, an armature-lever, one arm of which is coupled to the spring of the solenoid-core and the other provided with an armature in the field of force of said electromagnet 20, and said armature, whereby, when said branch circuit is broken the tension of said spring is reduced, substantially as and for the purpose set forth.

3. In a device for controlling electric currents, the combination with a dynamo, an external circuit fed by said dynamo, a solenoid in said external circuit, the movable core of said solenoid and its spring, a rheostat in the field-magnet circuit of the dynamo, and mechanism, substantially as described, whereby the movement of the solenoid-core controls the resistance in the said field-magnet coils, of a branch circuit from the main exterior circuit, lamps in said branch circuit, means for breaking said lamp-circuit, an electromagnet in said lamp-circuit, and means between said electromagnet and the core-spring of the solenoid, whereby the tension of said spring is increased when the said electromagnet is excited, substantially as set forth.

In witness whereof I have hereunto signed my name in the presence of two subscribing witnesses.

PATRICK KENNEDY.

Witnesses:
 PETER A. ROSS,
 HENRY CONNETT.